Jan. 5, 1926.  1,568,550

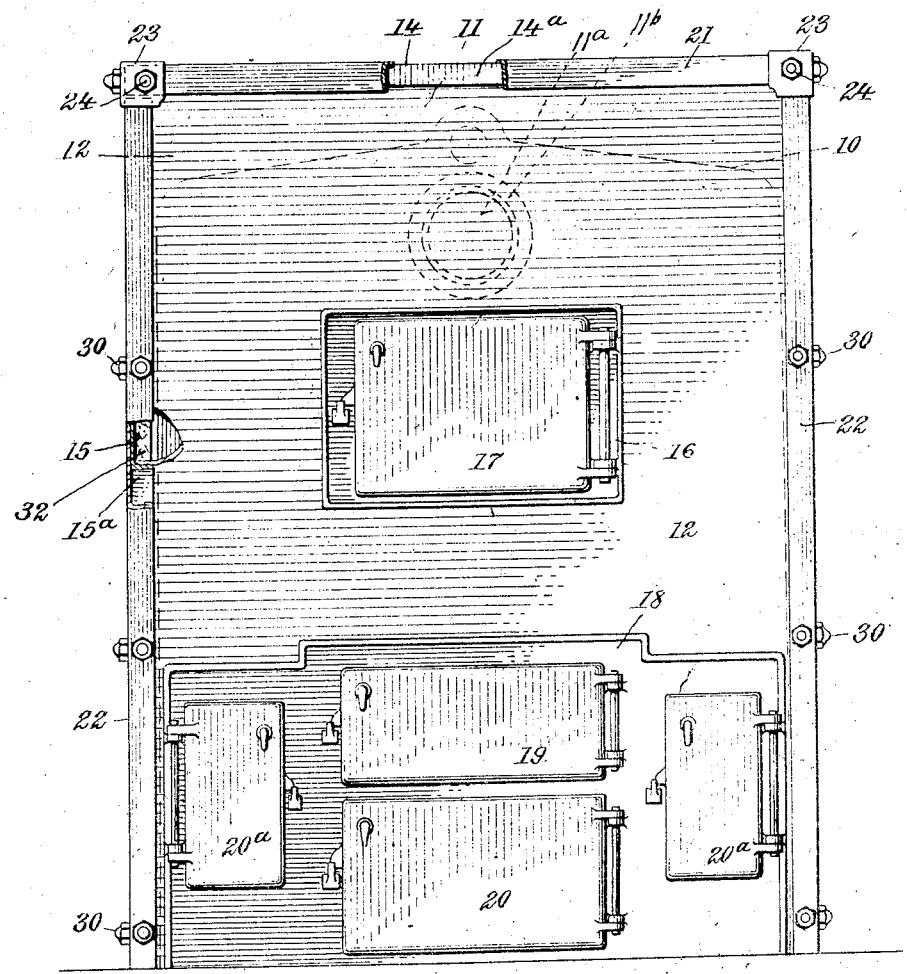

F. B. HOWELL

BOILER JACKET

Filed Jan. 17, 1921  3 Sheets-Sheet 2

Inventor
Frank B. Howell
By Conrad A. Dieterich
his Attorney

Jan. 5, 1926.

F. B. HOWELL 1,568,556

BOILER JACKET

Filed Jan. 17, 1921   3 Sheets-Sheet 3

Inventor
Frank B. Howell
By Conrad A. Dieterich
his Attorney

Patented Jan. 5, 1926.

1,568,556

UNITED STATES PATENT OFFICE.

FRANK B. HOWELL, OF BUFFALO, NEW YORK, ASSIGNOR TO AMERICAN RADIATOR COMPANY, OF CHICAGO, ILLINOIS, A CORPORATION OF NEW JERSEY.

BOILER JACKET.

Application filed January 17, 1921. Serial No. 438,054.

*To all whom it may concern:*

Be it known that I, FRANK B. HOWELL, a citizen of the United States, residing at Buffalo, Erie County, in the State of New York, have invented certain new and useful Improvements in Boiler Jackets, of which the following is a full, clear, and exact specification.

My invention relates to improvements in boilers, and the same has for its object more particularly to provide a simple, efficient and reliable jacket for boilers and analogous structures which may be readily secured to or removed therefrom.

Further, said invention has for its object to provide a jacket formed of a plurality of parts or sections which may be readily assembled and secured together in position upon a boiler.

Further, said invention has for its object to provide a jacket formed of a plurality of parts or sections each of which is provided upon its inner side with a suitable lining member or layer of heat-insulating material, and said jacket parts or sections so constructed and arranged that the same may be secured together to form a complete enclosure for a boiler.

Further, said invention has for its object to provide a jacket formed of a plurality of parts or sections each of which is provided with a layer or lining of heat-insulating material secured thereto whereby to permit of said jacket sections being conveniently adjusted in position upon a boiler, and then secured along their contiguous edges in order to hold said sections duly assembled and in position upon a boiler.

Further, said invention has for its object to provide a jacket composed of a plurality of parts or sections and a lining of heat-insulating material secured to and supported upon each of said parts or sections in such manner that the same cannot become displaced or injured either in the process of applying the same to the boiler, or as a result of the use of the boiler thereafter.

Further, said invention has for its object to provide a novel and convenient means f securing the several parts or sections ot the jacket together and in place upon a boiler.

Other objects will in part be obvious, and in part be hereinafter pointed out.

To the attainment of the aforesaid objects and ends my invention consists in the novel details of construction, and in the combination, connection and arrangement of parts hereinafter more fully described and then pointed out in the claims.

In the accompanying drawings wherein like numerals of reference indicate like parts—

Figure 1 is a front elevation of a boiler equipped with one form of jacket or covering constructed according to, and embodying my said invention;

Figure 3:
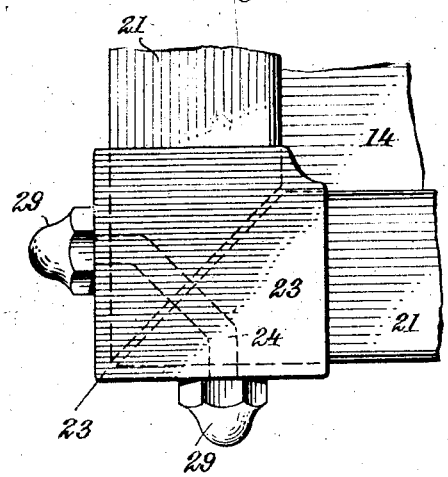
Fig. 3 is an enlarged detail top view of the jacket portion shown at Fig. 2.

In said drawings 10 designates a sectional boiler of the usual general form, and 11 denotes a jacket or housing secured in position thereon and completely enveloping the same.

The jacket 11 is preferably made of sheet metal and comprises a front 12, a rear or back, a top 14, and side members 15. The rear section is of the same form substantially as the front section 12. The front member of the jacket is provided with suitable openings corresponding with the fuel opening, slicing opening, ash-pit opening and flue openings of the boiler. Over the fuel openings is secured a frame 16, provided with a door 17, and over the remaining openings is secured a single large plate 18 provided with a slicing door 19, ash-pit door 20, and flue doors $20^a$.

The jacket section at the rear of the boiler is provided with the usual opening $11^a$ registering with the outlet of the smoke flue of the boiler over which is secured a frame having a collar or other suitable member $11^b$ for connection with a smoke pipe or stack.

In constructing the jacket 11 the side members 15, 15 preferably have their front and rear vertical edges bent at right angles thereto to form flanges 15ª, which overlap the opposite vertical edges of the front and back members of the jacket 11.

The top member 14 has its four corners cut away, and the edges of said member 14 intermediate said corners bent downwardly at right angles thereto to form flanges 14ª which overlap the upper edges of the front, back and side members of said jacket.

Figure 2:
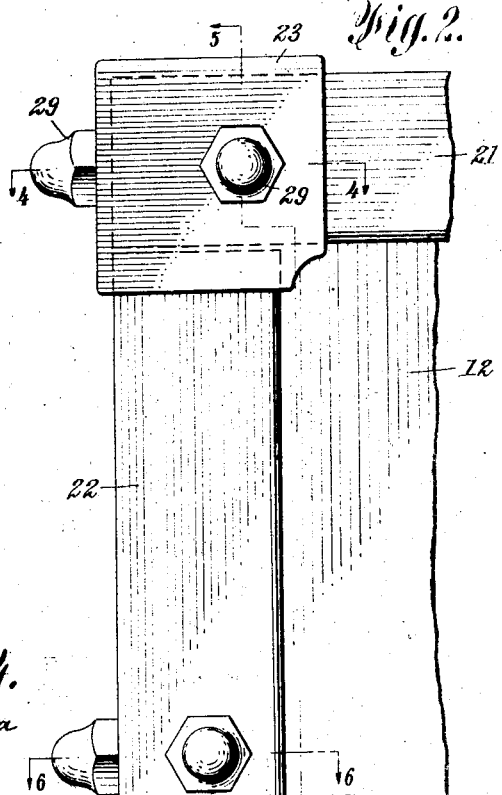
Fig. 2 is an enlarged detail side view showing one corner of a jacket.
Figure 4:
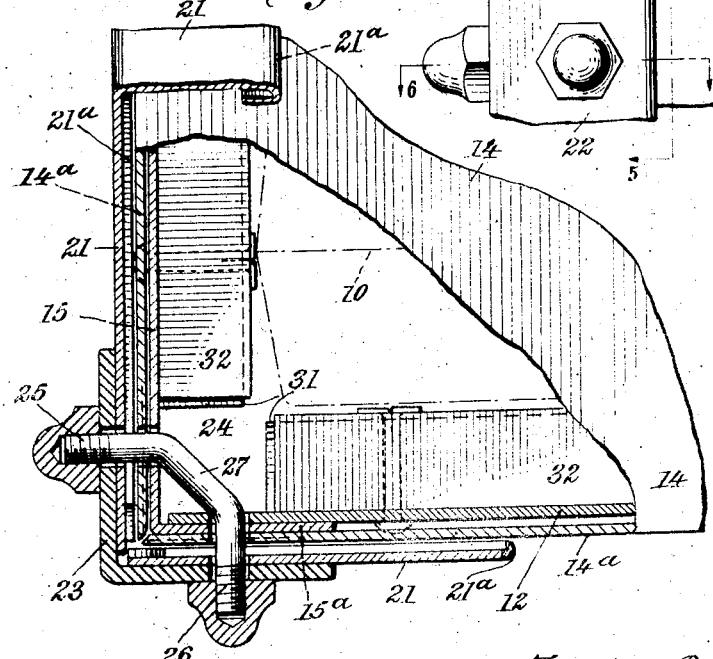
Fig. 4 is an enlarged detail top view, partly broken away and in section on the line 4—4 of Fig. 2.
Figure 5:
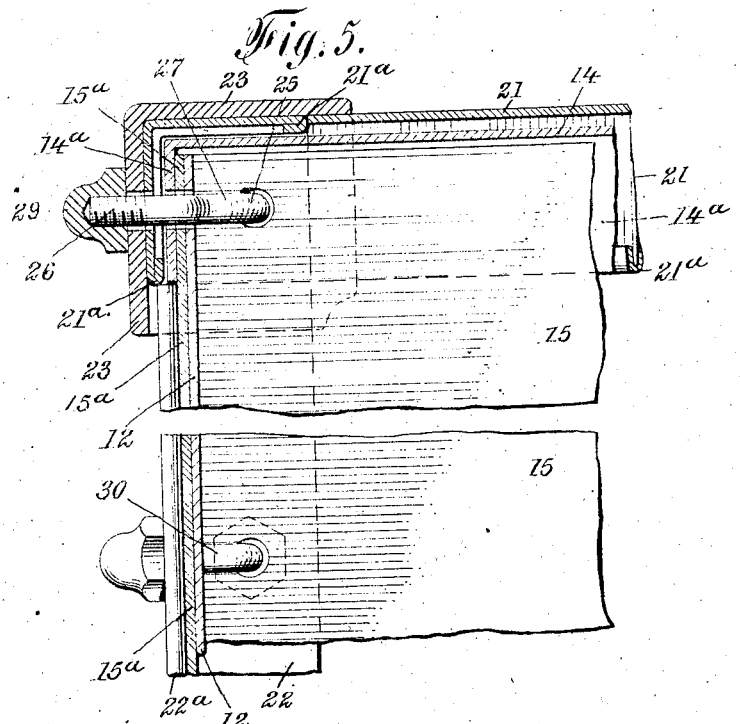
Fig. 5 is an enlarged detail vertical section on the line 5—5 of Fig. 2.
Figure 6:
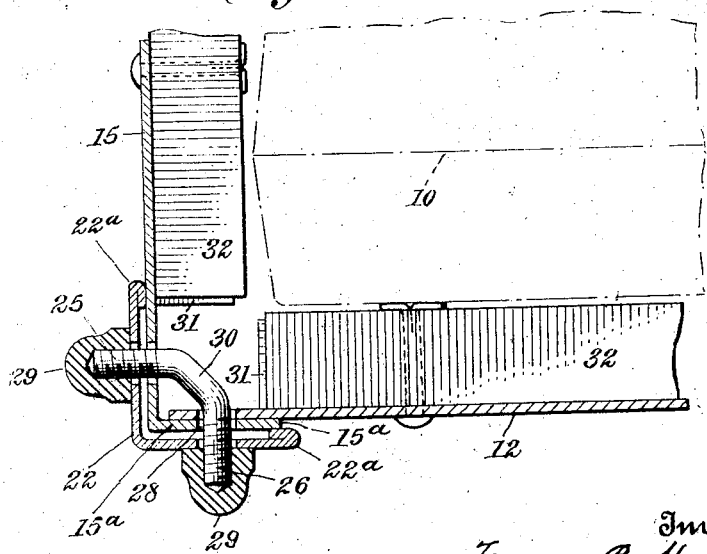
Fig. 6 is an enlarged detail transverse section on the line 6—6 of Fig. 2.

In order to give additional strength and rigidity to the jacket members, and to permit of the due securement of the adjoining parts to each other as well as to produce a finished appearance the four vertical and the four horizontal edges of the jacket are bound with angular edge members consisting of angle iron strips 21, 22, respectively. The horizontal angle members or strips 21 have the ends of their laterally-extending portions mitred, as shown at Fig. 3. The opposite longitudinal edges of said angle members or strips 21, 22 are folded or doubled to form rounded edges 21ª, 22ª, respectively. The upper ends of the vertical angle members 22 are squared and terminate immediately below the lower edges 21ª of the horizontal angle members 21, as shown at Fig. 2.

In order to reinforce the four upper corners of the jacket, and at the same time to give the same a finished appearance heavy corner pieces or members 23 formed of cast iron or of other suitable material are disposed thereon, and secured in place by bolts 24 comprising threaded ends 25, 26 arranged at right angles to each other and connected by a diagonal portion 27.

In order to form a perfectly secure and rigid joint at the four upper corners of the jacket the side wall members 15, the flange 15ª, the front member 12, the vertical portions of the top flanges 14ª, and the vertical side portions of the corner members are provided with horizontally elongated apertures 28 through which the threaded ends of the bolts 24 are passed and then secured by cap nuts 29.

The remaining portions of the vertical edges of the jacket, as well as the portions of the horizontal edges of the jacket are secured together by bolts 30 which correspond in shape to the bolts 24. The bolts 30 do not extend through the corner members 23, but only through suitable apertures provided in the two portions of the vertical angle members 22, the side members 15, the flange 15ª thereof and the front jacket member 12.

The lower horizontal edges of the side members 15, and of the back member of the jacket are turned inwardly at right angles thereto in order to form supporting flanges 31 upon which rest the lower edge of the insulating lining sections 32. The said lining sections 32 are riveted or otherwise fastened at suitable intervals to the side walls 15 in order to prevent the buckling or displacement thereof. The same manner of securement is employed in connection with the lining section for the top 14.

It will be noted that by means of my invention a boiler may be completely enclosed and insulated by a jacket of sectional construction whose parts are so constructed and arranged with respect to the other parts thereof that the same produces the appearance of a single or unitary structure, and that the angular bars disposed upon the vertical and horizontal edges which cooperate with the bolts and nuts to hold the parts rigidly secured together, also serve to conceal the joints formed at the meeting edges of the several jacket parts, and thereby produce a neat and finished appearance.

It is to be noted also that boilers used for domestic and other heating purposes are usually installed in cellars or places having low ceilings, and as such boilers are usually of considerable height the jacketing thereof is very frequently rendered extremely difficult owing to the small amount of head room. This difficulty has been overcome by means of my invention hereinabove set forth in which the sectional construction of the jacket with each element separately lined renders it extremely easy to apply the same to a boiler. Further, the securement of the jacket in place upon the boiler is also rendered extremely simple and convenient by reason of the novel securing means employed.

Having thus described my said invention what I claim and desire to secure by Letters Patent is:—

1. A boiler jacket comprising a top member and side members, flanges on said top member, and on certain of said side members overlapping the edges of the other of said side members, angular members embracing the angular edges of said side members, and the angular edges of said top and side members, corner pieces embracing the contiguous ends of said angular members, and securing members, certain of which extend through two adjoining side members, a side member flange and an angular edge member, and other of which securing members extend through said side members, the flanges of said top member, an angular edge member, and said corner pieces, substantially as specified.

2. A boiler jacket comprising a sheet metal top member and side members, insulating members secured to the inner side of said top and side members, flanges on said side members overlapping the edges of the adjacent side members, flanges extending from said top member and overlapping the upper edges of said side members, angular edge members each embracing the contiguous edges of said side members, angular edge members embracing the edges of the contiguous top and side members, and securing members each having one end extending through one side member of said jacket and one part of said angular edge member, and its other end extending through one of the adjacent wall members, the other part of said angular edge member, and the flange of one of said contiguous side members, substantially as specified.

3. A boiler jacket comprising a sheet metal top member and side members, insulating members substantially co-extensive in outline with said jacket members and secured thereto, flanges on said side members overlapping the edges of the adjacent side members, and flanges extending from said top member and overlapping the upper edges of said side members, angular edge members each embracing the contiguous edges of said side members, angular edge members embracing the edges of the contiguous top and side members, and securing members each having one end extending through one side member of said jacket and one part of said angular edge member, and its other end extending through one of the adjacent side members, the other part of said angular edge member and the flange of one of said contiguous side members, substantially as specified.

Signed at Buffalo, Erie County, in the State of New York, this 23d day of November, one thousand nine hundred and twenty.

FRANK B. HOWELL.